No. 888,245. PATENTED MAY 19, 1908.
L. G. MAITLAND.
JACK.
APPLICATION FILED OCT. 22, 1907.

Witnesses

Inventor
Lloyd G. Maitland
By Victor J. Evans,
Attorney

UNITED STATES PATENT OFFICE

LLOYD G. MAITLAND, OF RATON, TERRITORY OF NEW MEXICO.

JACK.

No. 888,245.      Specification of Letters Patent.      Patented May 19, 1908.

Application filed October 22, 1907. Serial No. 398,648.

*To all whom it may concern:*

Be it known that I, LLOYD G. MAITLAND, a citizen of the United States of America, residing at Raton, in the county of Colfax and Territory of New Mexico, have invented new and useful Improvements in Jacks, of which the following is a specification.

This invention relates to jacks designed for the purpose of lifting journal boxes for the purpose of repairing the same or renewing the brasses, one of the principal objects of the invention being to provide reliable means for holding the car wheel down upon the track while the journal box is lifted to release it from the axle.

Another object is to provide means whereby the journal box may be quickly released from the axle for the purpose of repair, while the wheel of the car is held down upon the track.

These and other objects may be attained by means of the construction illustrated in the accompanying drawing, in which:—

Figure 1:
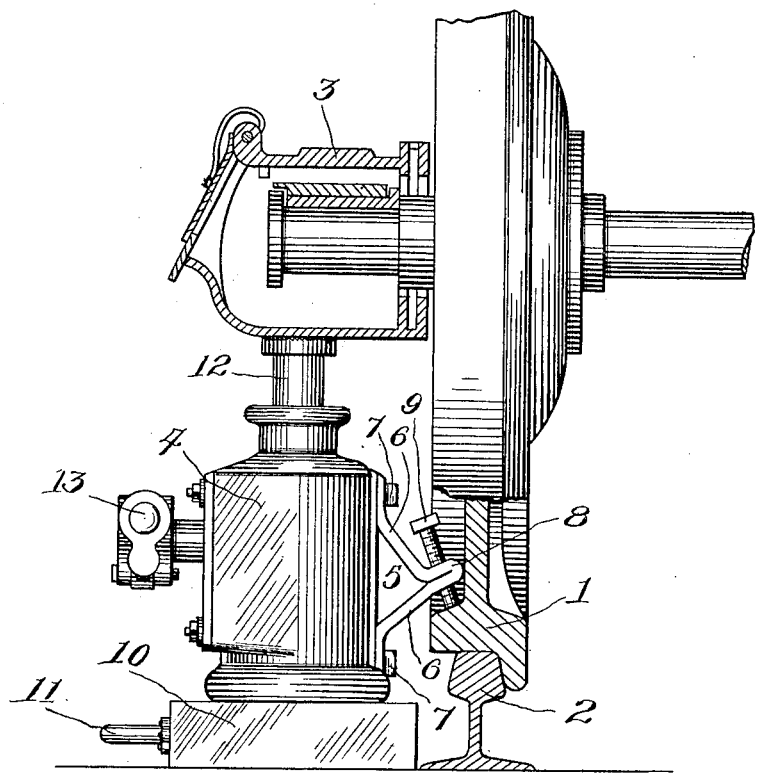
Figure 2:
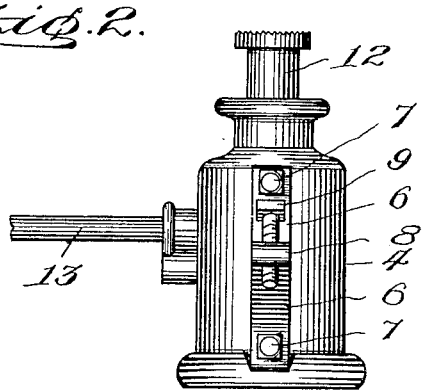

Figure 1 is a side elevation of a jack shown in position for use, and the journal box being shown in section. Fig. 2 is a rear elevation of the jack, showing the attachment for holding down the car wheel.

Referring to the drawing for a more specific description of my invention, the numeral 1 designates the car wheel and 2 the track on which said car wheel rests. 3 is a journal box, and 4 is a jack for raising the journal box relatively to the axle and wheel. The parts thus far described are of the ordinary or any suitable construction.

Secured to the rear portion of the jack casing is a bracket 5, said bracket having diverging members 6 securely bolted to the jack, as at 7. The two members 6 extend outwardly from the jack and are bent or doubled upon each other to form a strong bearing 8 for a set screw 9, and a threaded hole is formed in the bearing 8, said hole being inclined outwardly so that the set screw 9 will incline outwardly when adjusted in said hole, as shown in Fig. 1.

A removable platform 10 provided with a handle 11 by means of which it may be conveyed from place to place serves as a base upon which the jack 4 is placed. The set screw 9 is adjusted against the under side of the tread portion of the car wheel 1, and the jack spindle 12 is raised by means of the lever 13 in the usual manner.

From the foregoing it will be obvious that a jack provided with my attachment for holding the wheel down upon the rail is very convenient in use and saves much time in the repairing of axle boxes.

Having thus described the invention, what is claimed as new, is:—

The herein described railway jack, in combination with a removable platform, a lifting jack resting upon said platform, a bracket secured near the top and bottom at one side of said jack, said bracket having a doubled portion provided with a bolt hole, and a screw passing through said bolt hole in an inclined direction, said screw being adjustable in the bolt hole, substantially as described.

In testimony whereof I affix my signature in presence of two witnesses.

LLOYD G. MAITLAND.

Witnesses:
    G. E. LYON,
    M. S. COOK.